US008620652B2

(12) United States Patent
Chambers et al.

(10) Patent No.: US 8,620,652 B2
(45) Date of Patent: Dec. 31, 2013

(54) SPEECH RECOGNITION MACRO RUNTIME

(75) Inventors: Robert L. Chambers, Sammamish, WA (US); Brian King, San Diego, CA (US)

(73) Assignee: Microsoft Corporation, Redmond, WA (US)

( * ) Notice: Subject to any disclaimer, the term of this patent is extended or adjusted under 35 U.S.C. 154(b) by 1297 days.

(21) Appl. No.: 12/048,714

(22) Filed: Mar. 18, 2008

(65) Prior Publication Data

US 2008/0288259 A1 Nov. 20, 2008

Related U.S. Application Data

(60) Provisional application No. 60/938,518, filed on May 17, 2007.

(51) Int. Cl.
*G10L 15/00* (2013.01)
*G10L 21/00* (2013.01)

(52) U.S. Cl.
USPC .......................................... 704/231; 704/275

(58) Field of Classification Search
USPC .......................................... 704/231–257, 275
See application file for complete search history.

(56) References Cited

U.S. PATENT DOCUMENTS

| | | | |
|---|---|---|---|
| 5,664,061 A | 9/1997 | Andreshak et al. | |
| 5,671,328 A | 9/1997 | Fitzpatrick et al. | 395/2.55 |
| 5,864,819 A | 1/1999 | De Armas et al. | |
| 5,873,064 A | 2/1999 | De Armas et al. | 704/275 |
| 6,101,468 A | 8/2000 | Gould et al. | 704/251 |
| 6,263,375 B1 | 7/2001 | Ortega | 709/275 |
| 6,269,335 B1 * | 7/2001 | Ittycheriah et al. | 704/270 |
| 6,324,499 B1 | 11/2001 | Lewis et al. | 703/233 |
| 6,424,357 B1 | 7/2002 | Frulla et al. | 345/728 |
| 6,816,837 B1 | 11/2004 | Davis | 704/275 |
| 6,975,993 B1 | 12/2005 | Keiller | 704/275 |
| 2002/0013710 A1 | 1/2002 | Shimakawa | |
| 2003/0130854 A1 * | 7/2003 | Galanes et al. | 704/277 |

(Continued)

FOREIGN PATENT DOCUMENTS

| | | |
|---|---|---|
| JP | 2000-339309 A | 12/2000 |
| KR | 2002-0049150 A | 6/2002 |
| WO | WO 01/11607 A1 | 2/2001 |

OTHER PUBLICATIONS

Rayner, M. et al., "Grammar Specialisation Meets Language Modelling", html version of the file http://fluencyvoice.com, 2002, 5 pages.

(Continued)

*Primary Examiner* — Samuel G Neway
(74) *Attorney, Agent, or Firm* — Woodcock Washburn, LLP

(57) ABSTRACT

The disclosed speech recognition system enables users to define personalized, context-aware voice commands without extensive software development. Command sets may be defined in a user-friendly language and stored in an eXtensible Markup Language (XML) file. Each command object within the command set may include one or more user configurable actions, one or more configurable rules, and one or more configurable conditions The command sets may be managed by a command set loader, that loads and processes each command set into computer executable code. The command set loader may enable and disable command sets. A macro processing component may provide a speech recognition grammar to an API of the speech recognition engine based on currently enabled commands. When the speech recognition engine recognizes user speech consistent with the grammar, the macro processing component may initiate the one or more computer executable actions.

12 Claims, 3 Drawing Sheets

(56) References Cited

U.S. PATENT DOCUMENTS

| | | | | |
|---|---|---|---|---|
| 2004/0054538 | A1 | 3/2004 | Kotsinadelis | 704/270 |
| 2005/0283367 | A1* | 12/2005 | Ativanichayaphong et al. | 704/270 |
| 2006/0095628 | A1* | 5/2006 | Ludwig et al. | 710/302 |
| 2006/0206336 | A1* | 9/2006 | Gurram et al. | 704/275 |
| 2007/0101313 | A1* | 5/2007 | Bodin et al. | 717/114 |

OTHER PUBLICATIONS

White, G.M. et al., "Spoken Language Understanding for Personal Computers", http://www.cs.mu.oz.au, 241-248.

IBM ViaVoice, Advanced Edition, http://www.nuance.com/vaivoice/advanced, 2005, 1 page.

Speech Recognition for Mac OS X, http://www.macspeech.com/support/index, Downloaded from Internet May 29, 2007, 1 page.

EP Application No. 08755480.4: Extended European Search Report, Apr. 28, 2011, 8 pages.

PCT Application No. PCT/US2008/063632 : International Search Report of the International Searching Authority, Oct. 22, 2008, 2 pages.

"How Can I Determine Which USB Devices are Connected to a Computer?", Hey, Scripting Guy! Blog, May 15, 2005, Retrieved from the Internet: URL:http://blogs.technet.com/b/heyscriptingguy/archive/2005/03/15/how-can-i-determine-which-usb-devices-are-connected-to-a-computer-.aspx [retrieved on Nov. 30, 2012].

\* cited by examiner

SPEECH RECOGNITION MACRO RUNTIME

CROSS REFERENCE TO RELATED APPLICATIONS

This application claims benefit under 35 U.S.C. §119(e) to U.S. Provisional Application No. 60/938,518, filed May 17, 2007, the content of which is incorporated by reference herein in its entirety.

BACKGROUND

Early speech recognition systems for computer users have provided basic dictation capabilities. These systems converted spoken words into written text. Often these systems were implemented as user applications run on top of the computer's operating system in cooperation with other user applications, such as word processing applications.

Later speech recognition systems sometimes included command and control functionality, in addition to dictation, by providing static, predefined operations. These operations enabled limited control of the user interface, such as starting applications and switching between applications.

With these legacy speech recognition systems, creating new voice commands requires knowledge of the speech recognition application programming interface (API) and extensive software development, such as C++ programming. The new operations would require custom developed software applications interfaced with the speech recognition API. Because the mammoth development effort required to create, update, and maintain new operations with these systems, providing personalized operations, tailored to the needs of the individual user, is impractical.

SUMMARY

The speech recognition system, disclosed herein, enables users to define personalized, context-aware voice commands without extensive software development. Command sets may be defined in a user-friendly macro language. Command objects, within a command set may include one or more user configurable actions, one or more configurable rules, and zero or more configurable conditions.

The command sets may be managed by a software subsystem, the command set loader, that loads and processes each command set into computer executable code, such as Common Object Model (COM) objects. Command data may be defined by an eXtensible Markup Language (XML) file. For example, the XML file may be created by a software provider, by the user directly, and/or by the user via a series of user interface prompts. The command set loader may monitor for changes in the command data and may change, enablen and/or disable command sets.

The speech recognition system may include a macro processing component. The macro processing component may interface with the loaded command sets and the computer's speech recognition engine. The macro processing component may evaluate the commands to determine which commands are presently enabled, in accordance with an evaluation of each command's included conditions. The macro processing component may provide a speech recognition grammar to the speech recognition engine based on currently enabled commands. The conditions and/or the commands themselves may be monitored for changes. Changes in the evaluation of the conditions and/or changes in the commands themselves may direct the macro processing component to generate an updated grammar and to provide the updated grammar to the speech recognition engine.

When the speech recognition engine recognizes user speech consistent with the grammar, the speech recognition engine may provide a recognition indication to the macro processing component. The macro processing component may determine the corresponding command. The macro processing component may process each corresponding command, initiating the one or more computer executable actions associated with the corresponding command. Thus, a user may define complex voice enabled macros without extensive computer programming and/or custom software development.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
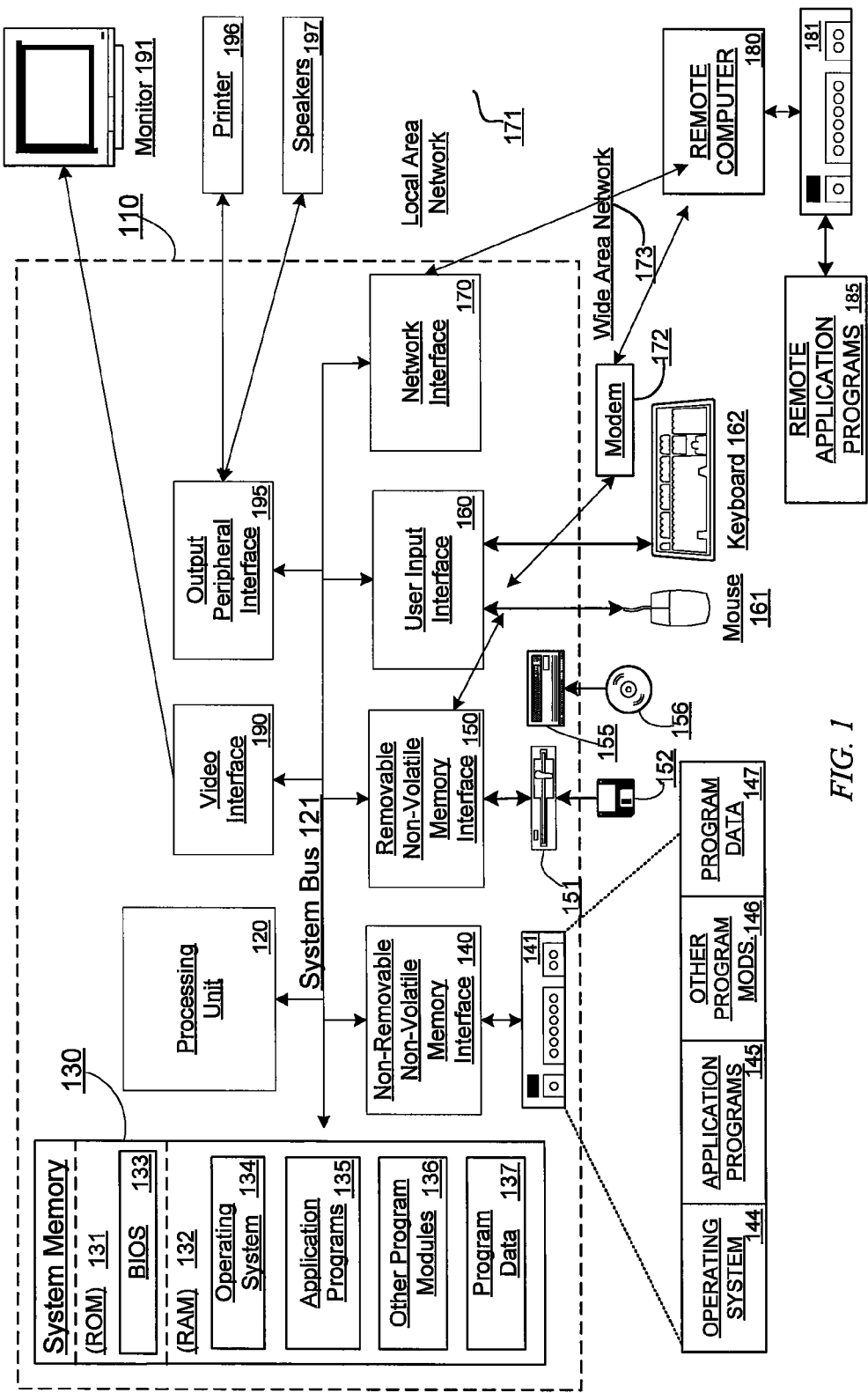
FIG. 1 depicts an exemplary computing environment.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 1 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone 198, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 2:
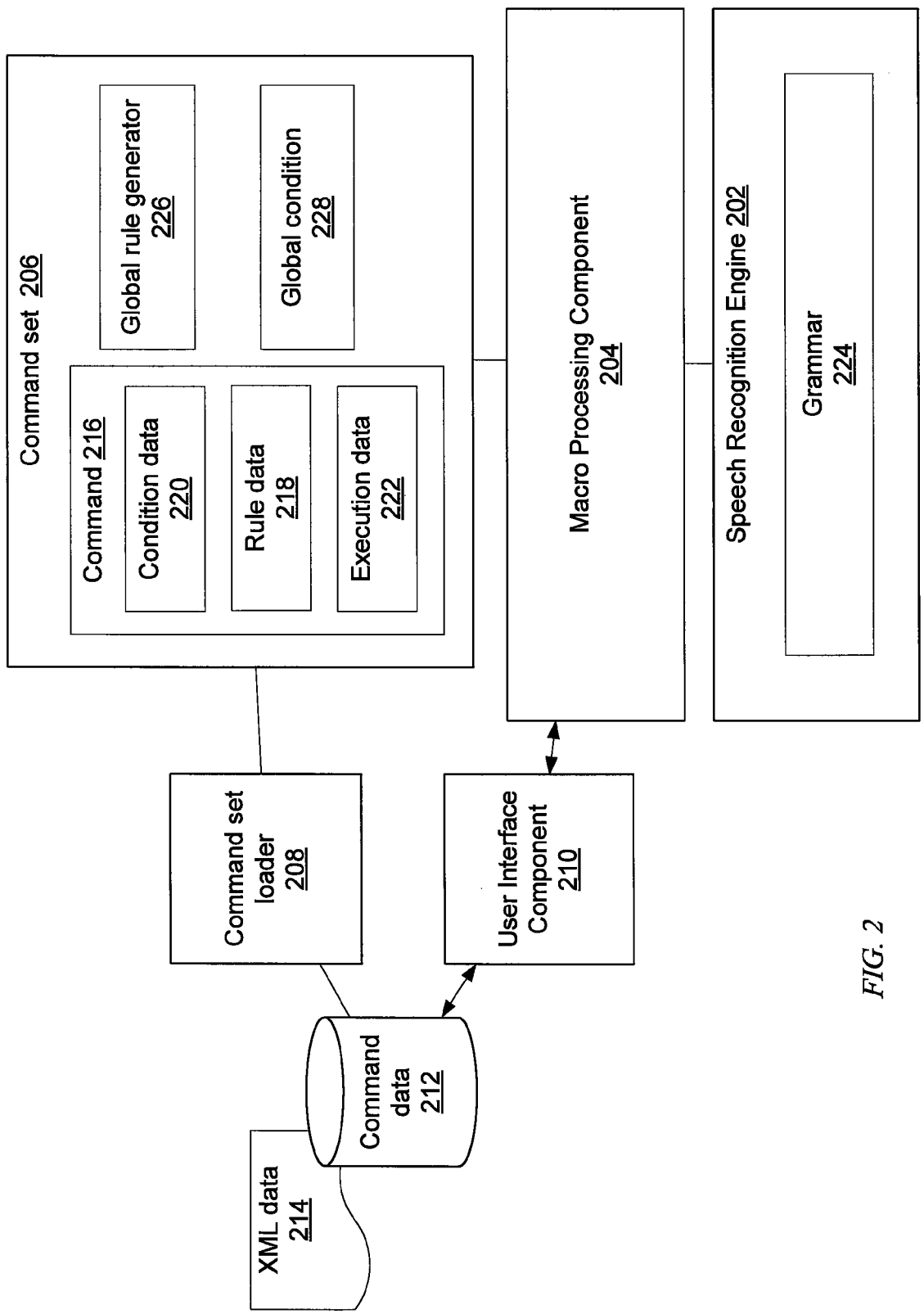
FIG. 2 depicts an example system for processing speech recognition macros.

FIG. 2 depicts an example system for processing speech recognition macros. The system may operate on or in connection with the computing environment 100 shown in FIG. 1. The example system may include a speech recognition engine 202, a macro processing component 204, a command set 206, a command set loader 208, and/or a user interface component 210. The command set loader 208 may retrieve command data 212, such as an eXtensible Markup Language (XML) data 214. The command set loader 208 may establish one or more command sets 206. The command set loader 208 may monitor the command data 212 for changes. Upon detecting a change, the command set loader 208 may update the associated command set 206.

The command set 206 may define a plurality of commands 216, which may enable advanced, configurable voice macros. Each command 216 may include rule data 218, condition data 220, and/or execution data 222. The rule data 218 may include a word and/or phrase that the user would like the system to recognize. The condition data 220 may include zero or more conditions under which the user would like the system to recognize that word and/or phrase specified by the rule data 218. The execution data 222 may include one or more computer executable actions the user would like the system to initiate upon recognition of that word and/or phrase specified by the rule data 218.

The macro processing component 204 may interface with command set 206 to generate a speech recognition grammar 224 associated with the command set 206 for the speech recognition engine 202. When the speech recognition engine 202 detects verbal speech consistent with the grammar 224, the speech recognition engine 202 may report the recognition event to the macro processing component 204. The macro processing component 204 may initiate the proper action and/or execution associated with the recognition event and consistent with the commands 216. The conditions defined by the commands 216 may be monitored for a change in status. Upon a state change of a condition, the macro processing component 204 may generate an updated grammar 224, adding and/or removing words and/or phrases in accordance with the rule data 218 associated with the changed condition.

The speech recognition engine 202 may include any hardware, software, combination thereof, any system, subsystem, and/or component suitable for discerning a word and/or phrase from an audio speech signal. For example, the speech recognition engine 202 may receive an audio stream and process it. The processing may, for example, include hidden Markov model-based recognition, neural network-based recognition, dynamic time warping-based recognition, knowledge-based recognition, or the like. The speech recognition engine 202 may process the audio stream in real time. For example, the speech recognition engine may receive the audio stream via microphone 198, as shown in FIG. 1.

The speech recognition engine 202 may recognize a word in accordance with a grammar 224. The grammar 224 may include a structured listing of target words for which the speech recognition engine 202 will listen and/or the patterns associated with the target words. The speech recognition engine 202 may process multiple grammars. Each grammar 224 may include an identifier.

When the speech recognition engine 202 recognizes a word from the audio stream consistent with the grammar 224, the speech recognition engine 202 may return a recognition indication. The recognition indicate may include the recognized word, the identifier of the grammar 224 with which the recognized word is associated, and/or a confidence metric.

The command data 212 may include any data structured to define speech recognition macro commands 216. The command data 212 may be stored locally at a computer. For example, the command data 212 may be stored in a directory in a computer file system. The command data 212 may be listed in the computer's registry. The command data 212 may be stored remotely and accessed by the computer via a network. For example, the command data 212 may be accessed via a Really Simple Syndication (RSS) feed. The command data 212 may be accessed via the Secure Hypertext Transport Protocol (HTTPS). Each instance of command data 212 may correspond to a command set 206. The command data 212 may define one or more commands 216.

The command data 212 may include XML data 214. The XML data 214 may define commands 216, conditions, rules, and/or executable actions. The XML data 214 may include an XML file on the local disk stored with a VCMD file extension.

The XML data 214 may include tags and structure that conforms with a defined speech macro specification. The speech macro specification may define certain tags to have specific meaning and function. The speech macro specification may define a structure for the tags. For example, the tags may identify commands 216 and the nature of those commands 216. rule data 218, condition data 220, and/or execution data 222 may be delimited according to XML tags. The tags may define aspects of the data that they delimit. To illustrate, each command 216 may be delimited by the tags <command></command>. The word and/or phrase associated with the rule data 218 may be delimited by the tag <listenFor></listenFor>. The conditions associated with the condition data 220 may be defined by the text of the tag itself, and the parameters of the condition may be delimited by the tag. To illustrate, a condition that is true when the application notepad.exe is in the foreground may by represented by <appIsInForeground processName="notepad.exe"/>. Similarly, the computer executable actions associated with the execution data 222 may be defined by the text of the tag itself, and the parameters of the computer executable action may be delimited by the tag. To illustrate, a computer executable action that launches the application notepad.exe may be represented by <run command="notepad.exe"/>. Thus, a command may be represented as a collection of XML tags delimiting data.

The command set loader 208 may monitor the command data 212. When the command set loader 208 detects a change in the command data 212, command set loader 208 may synchronize the command set 206 and command data 212. The change may include removing, adding, and/or replacing command data 212. The command set loader 208 may periodically poll the command data 212 for changes. For example, if a change is detected, the affected command set 206 may be unloaded and re-loaded consistent with the change. For example, the command set loader 208 may detect that command data 212 has been removed (e.g., an XML data file 214 has been deleted) and the command set loader 208 may similarly remove command set 206. The command set loader 208 may include a configurable timer that triggers periodic checking of the command data 212.

The command set loader 208 may include an XML schema parser. The XML schema parser may confirm that the command data 212 is in proper XML format. The command set loader 208 may extract command sets from the command data 212 and store the command sets in memory. The command set loader 208 may create and/or populate Common Object Model (COM) objects according to the command data 212. The command set loader 208 may establish one or more command sets 206 in accordance with the command data 212.

The command sets each may include commands 216, global rule generators 226, and/or global conditions 228. The command sets and/or their contents may be COM objects. The command set 206 may interface with the macro processing component 204. The command set 206 may represent the unit of distribution of speech recognition macros. For example, a user may define speech recognition macros for different applications (e.g., e-mail macros, work macros, internet macros, etc.). Each set of macros may be collected into a different command set 206. Each command set 206 may be associated with a different XML data file 214. The commands 216 may include rule data 218, condition data 220, and/or execution data 222. Each command 216 may relate a rule data 218, condition data 220, and/or execution data 222 to define a speech recognition macro.

Rule data 218, such as rule generators, may define the words and/or phrases for which the user wishes the speech recognition engine 202 listen. The rule data 218 may correspond to the speech that will trigger the speech recognition macro. The rule data 218 may reference a static word and/or phrase, such as static text data. For example, the rule data 218 may include plain text, corresponding to a word to be recognized. The plain text may be converted to a SAPI 5 based rule.

The command set 206 may be associated with one or more global rule generators 226. The global rule generators 226 may define a rule that applies to each command 216 within the command set 206. The global rule generators 226 may be a short-hand way to include a rule in many commands 216 with few lines of XML code.

The rule data 218 may reference a dynamic word, such as a dynamic word based on the present operating environment. For example, the rule data 218 may reference any word or ordered set of words that exist in an active text document window. To illustrate, if a text editor application is the foreground application, any text contained in the document may be exported as a rule. The rule data 218 may reference the names of applications that can be started via the Start menu or desktop. Users may use this rule to access applications by name without having to have a separate rule for each application.

The rule data 218 may include a list of all of the named controls in the current application. To illustrate, a text editor in foreground may relate to the named controls, such as menu headings like "File," "Edit," "Format," etc. and window controls like "Close," "Minimize," etc. The rule data 218 may contain a list of applications currently running on the system, such as those seen in an Alt-Tab list. The rule data 218 may reference a list of phrases. Each phrase optionally may be associated with a respective semantic property. The rule data 218 may include an ordered subset of the phrase used to trigger the rule. The rule data 218 may include a SAPI 5 XML rule.

The rule data 218 may be used to generate a list of phrases corresponding to accessible items underneath a specified User Interface (UI) element. The rule data 218 may be used to generate a single phrase for the application that is in the foreground. For example, this may be used whenever a referencing rule needs to use the text from the current application. The rule data 218 may be used to generate a set of phrases for all the applications that are currently running. For example, this rule may be used to generate a list of all the applications that are currently running, enabling a speech recognition macro such as "Close [name of application]."

The rule data 218 may be associated with application data. The rule may be used to generate a set of words for all the files in a specified directory. The rule data 218 may generate a rule based on items found in the Inbox and/or Sent Items folder in a Messaging Application Programming Interface (MAPI)-compliant mail system. For example, a phrase part of the rule may include the name of the sender and/or recipient of a message and the semantic property may contain the email address. The rule data 218 may dynamically include items from media player application, such as name, artist, title, genre, track number, or the like.

The rule data 218 may reference words and/or phrases in accordance with the result of a script. For example, the script may include Visual Basic script, Java script, or the like.

The condition data 220 may define when the command is enabled (i.e., when the speech recognition should listen for the words and/or phrases identified by the rule data 218). A command may have zero conditions, in which the command may be enabled all the time. A command may have one condition, in which that condition may be satisfied before the command is enabled. The command may have more than one condition, in which all of the listed conditions should be satisfied to enable the command. The command may have more than one condition grouped together by logical operators such as AND, OR, XOR, etc.

The command set 206 may be associated with one or more global conditions 228. The global condition 228 may define a condition that applies to each command 216 within the command set 206. The global condition 228 may be a short-hand way to include a condition in many commands 216 with few lines of XML code.

Conditions may be used to enable commands 216 based on any aspect of computer operation. Conditions may depend on one or more operations of the computer. Conditions may depend on one or more operations of other devices in communication with the computer. For example, a condition may depend on the content of web page from a remote web server. Conditions may depend from software attributes, such as the running applications and/or aspects of the computer operating system. Conditions may depend from hardware attributes, such as the presence of a Universal Serial Bus (USB) device, for example.

The condition may check to see if a specific application is the foreground window or not. For example, the condition may check via process name or window title. The condition may check to see if a specific application is running or not. The condition may check via process name or window title. The condition may check to see if a specific application is installed or not. For example, it may check by process name.

The condition may check to see if there is an insertion point in an editable field. The condition may check to see if there is a selection in an editable field. This condition may be used to control commands 216 that should only be enabled (or disabled) when there is a selection, such as dictation commands 216 that manipulate the selection.

The condition may check to see if there is a user interface (UI) element with the specified properties. This condition may be used to control commands 216 that should only be enabled (or disabled) when specific UI elements are present. This may be useful when trying to apply a speech recognition macro to a specific aspect of an application, rather than the application as a whole.

The condition may check to see if there is a named state, and optionally may check the value of the named state. This condition may be used to provide dialog control. The condition data 220 may include scripting to programmatically determine if the condition is met or not. The condition data 220 may direct the initiation of an associated script, provided with the condition object model, which may indicate whether the condition is met or not. For example, the script may include Visual Basic script, Java script, or the like.

The execution data 222 may define a computer executable action to be taken when the speech recognition engine 202 recognizes a word and/or phrase identified by the rule data 218. The execution data 222 may define one or more executable actions. The executable actions may be associated with one or more computer executable actions. The actions may be statically defined or dynamically defined.

The executable action may set the text feedback in the speech user interface. The executable action may provide specified speech back to the user. For example, the speech may be generated with a text-to-speech system. The executable action may start a new application. The executable action may switch to a specified application. The executable action may close a specified application. The executable action may minimize a specified application. The executable action may maximize a specified application. The executable action may restore a specified application. The executable action may simulate keys being sent to the application in the foreground. This executable action may be used to simulate user input from the keyboard.

The executable action may insert text into an active document. The executable action may insert part of the recognition result into an active document. To illustrate, the user may define a macro that launches a web browser application and enters the spoken Universal Resource Locator (URL) into the address field of the web browser application.

The executable action may emulate speech recognition. For example, the executable action may be used to simulate a speech recognition with a textual phrase. The speech recognizer will pretend that it heard the user say what is to be emulated. The executable action may causes an Microsoft Active Accessibility (MSAA) element to be clicked and/or executed. If the MSAA element can not be located, the list of executable actions for the command may terminate at this executable action.

The executable action may wait for a specified amount of time. For example, this executable action may be used to ensure enough time for application to load before the command continues by an action related to the application. The executable action may confirm with the user that the command should continue its execution. For example, a dialog box may be displayed to the user with a "Yes" and a "No" button. The executable action may inform the user with a message box type dialog. For example, the dialog may have a message and an "OK" button. The executable action may be used to prompt the user with a dialog box with an edit control containing text the user can manipulate.

The executable action may set a named state to a specific value. The named states may be used to develop complex macros. For example, the named states may be used to link commands 216 together. This executable action may be used to simulate a dialog control.

The executable action may be a disambiguate executable action. The disambiguate executable action may be used to disambiguate potentially ambiguous properties or text from a recognition result. If the item being disambiguated is ambiguous, a dialog box may be displayed to the user allowing the user to choose the specific item from the list. For example, the speech recognition component may return a recognition indication responsive to homophonous speech. Responsive to the recognition indication the disambiguate executable action may direct a user interface to display a plurality of words consistent with the homophonous speech. The user may select from the list the word that corresponds to the user's intended meaning.

The executable action may control an interactive media player. For example, this executable action may be used to direct media player controls, such as play, pause, stop, or the like. The executable action may select audio in an interactive media player. This executable action may be addressed by words associated with stored media, such as name, artist, title, genre, track number, or the like. The executable action may provide access to e-mail applications. The executable action may be used to run script code from within the macro framework.

The condition data 220, rule data 218, and the execution data 222 may be related to semantic properties. Semantic properties may enable executable actions to operate on data related to the speech the user spoke. To illustrate, a speech recognition macro for sending e-mail may wish to be responsive to "Send email to Rob." The e-mail address for Rob would be a semantic property, i.e. data related to the spoken work "Rob." Rule data 218 may include a semantic property name. Thus, the rule data 218 for this command may indicate to listen for "Send e-mail to [person]." The term "[person]" may be label corresponding to the speech recognized at that point in time, associated with the other words in the phrase. The term "[person]" may be linked to the paired list with names and associated e-mail addresses. As a semantic property, any executable actions that refer to the label may be returned the text that was spoken. Again to illustrate, if the user said "Send email to Rob", the semantic property named "person" would have the value of "Rob".

In an embodiment, a command set 206 may include at least two command objects, such that the execution data 222 of the second command object defines the first command object. For example, the execution data 222 from the second command object may define a condition of the first command object. The execution data 222 from the second command object may establish a named state, and the condition of the first command object may depend on the named state.

In this manner, multiple command objects may be strung together in complex patterns. To illustrate, a user may wish to design a macro that operates in two modes. The user may wish to operate in one mode at home and in another mode at work. The user may create a second command object that listens for the phrase "I am at home." The execution data 222 associated with this second command object may established a named state associated with the home mode. The user may create a first command object that listens for the phrase "check e-mail." To ensure that the first command object will check the user's personal e-mail account rather than the user's work e-mail account, the second command object may include a condition that depends on the named state associated with the home mode.

The macro processing component 204 may manage the grammar 224 and/or the operation of the speech recognition engine 202 according to the condition data 220 and rule data 218 of the commands 216. The macro processing component 204 may include a software component that interfaces with one or more command sets 206 and/or the speech recognition engine 202. The macro processing component 204 may evaluate each command 216 in each command set 206. The macro processing component 204 may receive an outcome of an evaluation of each condition. The macro processing component 204 may evaluate the condition data 220 for each command 216.

In accordance with condition the data 220, the macro processing component 204 may select rule data 218 to be included in a speech recognition grammar 224. For example, the macro processing component 204 may include rule data 218 in a speech recognition grammar 224 when the condition of the condition data 220 evaluates as true. The macro processing component 204 may generate a grammar 224 in accordance with the outcome of the evaluation of the condition data 220. The macro processing component 204 may generate a respective grammar 224 for each command set 206. The macro processing component 204 may identify each grammar 224 to associate each grammar 224 with a respective command set 206.

The macro processing component 204 may communicate the grammar 224 to the speech recognition engine 202. The macro processing component 204 may communicate with a speech recognition engine 202 through an application programming interface (API), such as speech application programming interface (SAPI), for example.

The speech recognition engine 202 may recognize human speech in accordance with the grammar 224. When the speech recognition engine 202 recognizes a spoken word found in the grammar 224, the speech recognition engine 202 may return a recognition indication to the macro processing component 204. The result may include the recognized word and/or an indication of which grammar 224 was used. The macro processing component 204 may select the correct command set 206 in accordance with the recognized word. The macro processing component 204 may launch and/or initiate the computer executable actions associated with the selected command.

The macro processing component 204 may monitor the conditions defined by the command set 206. For example, each condition may be associated with an object such that when the state of the condition changes, the object may report back to the macro processing component 204. The macro processing component 204 may receive an updated state. The macro processing component 204 may generate an updated grammar 224 corresponding to the new state. For example, a condition may go from true to false, and the macro processing component 204 may generate a updated grammar 224 that has removed the associated words. Similarly, a condition may go from false to true, and the macro processing component 204 generate an updated grammar 224 with additional words.

The user interface component 210 may be in communication with the macro processing component 204, the speech recognition engine 202, the command set loader 208, and/or the command data 212. The user interface component 210 may be any collection of features and functionality suitable for providing a graphical and/or textual user interface for managing, controlling, evaluating, monitoring and/or configuring components of the speech recognition macro processing system. The user interface may enable a user to generate command data 212 through a step-by-step "wizard" process. The user interface component 210 may enable a user to identify and configure the locations and set a monitoring frequency associated with command set loader 208. The user interface component 210 may provide a graphical and/or textual display of the current active commands 216 and/or command sets. The user interface component 210 may display the grammars in use. The user interface component 210 may enable a user to enable or disable aspects of the system through buttons, checkboxes, radio selectors, or the like. The user interface component 210 may have a graphical representation for presentation to the user. For example, the user interface component 210 may be graphically present in a computer desktop, window, toolbar, system tray, or the like.

Figure 3:
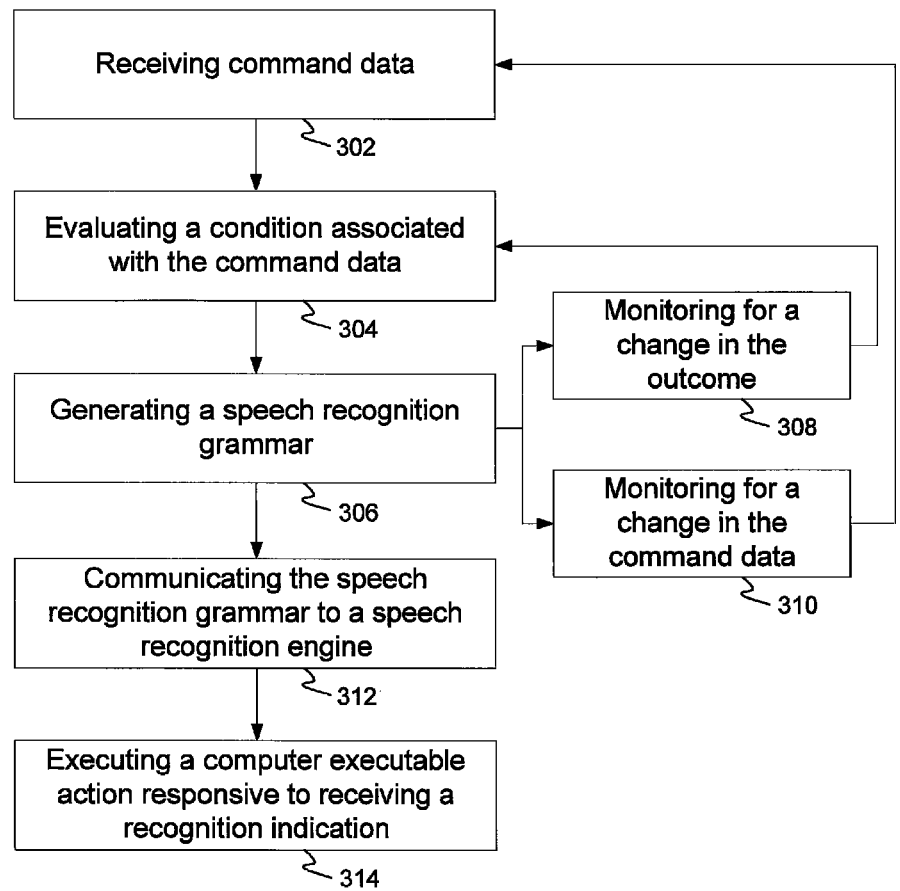
FIG. 3 depicts an example method of using a speech recognition engine.

FIG. 3 depicts an example method of using a speech recognition engine 202. At 302, a speech macro processing system may receive command data 212. The command data 212 may be accessed locally and/or remotely. The command data 212 may be stored on a local disk or on a remote disk from a network location. The command data 212 may be in the form of an XML script file and/or XML script formatted data. The command data 212 may be received from a network location in accordance with a really simple syndication (RSS) feed.

The speech recognition macro processing system may verify a digital certificate associated with the command data 212. Verifying the digital certificate may ensure data integrity and authentication of the command data 212. Command data 212 in XML form may be parsed to populate command objects. The command objects may include condition data 220, rule data 218, and/or execution data 222.

The command objects may be statically defined. For example, the command data 212 may include static XML formatted code that statically defines the command object. The command object may be dynamically defined. For example, the command data 212 may include scripting and/or run-time code that, when executed, dynamically defines the command object.

At 304, a condition associated with the command object may be evaluated. The condition may depend on any aspect of operation of the computer system. The condition may evaluate to an outcome. For example, the outcome may be valued as true or false. If the condition evaluates as true, the command object may be active. If the condition evaluates as false, the command object may be inactive.

At 306, a speech recognition macro processing system may generate a speech recognition grammar 224. The speech recognition grammar 224 may be generated in accordance with the command object. When the command object is active, the grammar 224 may include a word associated with the rule data 218 of the command object. When the command is inactive, the macro processing system may exclude the word or words associated with the rule data 218 from the grammar 224.

At 308, the condition associated with the command object may be monitored for a change in state. The change in state may be indicated by a change in outcome when evaluating the condition. The condition may be reevaluated, at 304, and an updated speech recognition grammar 224 may be generated at 306. In an embodiment, the condition may be a COM object that reports changes in its evaluation outcome to a parent object.

At 310, the command data 212 may be monitored for a change, such as a change in the XML formatted data stored on a local drive, an update to the RSS feed, or the like. The command data 212 may be monitored for changes to the command sets, for additional command sets, and for the removal of command sets. The updated command data 212 may be received, at 302, and the conditions associated with the updated command data 212 may be evaluated at 304. An updated speech recognition grammar 224 may be generated in accordance with the updated command data 212, at 306.

At 312, the generated speech recognition grammar 224 may be communicated to a speech recognition engine 202. The monitoring at 308 and at 310 may continue. As the speech recognition grammar 224 is updated consistent with changes in conditions at 308 and/or changes in command data 212 at 310, the updated speech recognition grammar 224 may be communicated to the speech recognition engine 202.

The speech recognition engine 202 may operate on the updated speech recognition grammar 224. The speech recognition engine 202 may analyze an audio stream. When the speech recognition engine 202 recognizes a match between the audio stream and the grammar 224, the speech recognition engine 202 may return a recognition indication. The recognition indication may be associated with a word included in the rule data 218 of an active command object.

At 314, responsive to the recognition indication, a computer executable action may be executed. The computer executable action may be associated with the word specified by the recognition indication and the associated command. The word may be included in the rule data 218 of the command object, and the computer executable action may be included in the execution data 222 associated with the command object. To illustrate, the macro processing component 204 may receive the recognition indication. The macro processing component 204 may determine from the recognition indication the associated command set 206. Macro processing component 204 may determine from the recognition indication the associated command object within that command set 206. The macro processing component 204 may initiate one or more computer executable actions associated with the execution data 222 of that command object.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer system comprising:
   a first command set comprising a first command object, wherein the first command object comprises first data indicative of:
   a first word;
   a condition comprising a dependency on a hardware attribute of the computer system, the hardware attribute being indicative of a presence of a Universal Serial Bus (USB) device; and
   a computer executable action;
   a speech recognition component, wherein the speech recognition component is adapted to receive a grammar and to return a recognition indication responsive to speech consistent with the grammar; and
   a macro-processing component in communication with the speech recognition component, wherein the macro-processing component is programmed to receive the first command set, to generate the grammar in accordance with an evaluation of the condition, and to execute the computer executable action responsive to the recognition indication, wherein the recognition indication corresponds to the first word.

2. The system of claim 1, further comprising a loader component programmed to define the first command set from a first extensible markup language (XML) script file.

3. The system of claim 1, wherein the first command set comprises a second command object and a global executable action, wherein the computer executable action references the global executable action, and wherein the second command object comprises a second computer executable action that references the global executable action.

4. The system of claim 1, further comprising a user interface, and wherein the speech recognition component returns the recognition indication responsive to homophonous speech consistent with the grammar, the user interface displays a plurality of words consistent with the homophonous speech.

5. A computer-readable storage medium that is not a transient signal, the computer-readable storage medium comprising computer instructions that when executed by a processor cause the processor to effectuate operations comprising:
   receiving a command set comprising a first command object, the first command object comprising first data indicative of:
   a first word;
   a condition comprising a dependency on a hardware attribute of the computer system, the hardware attribute being indicative of a presence of a Universal Serial Bus (USB) device; and
   a computer executable action;
   evaluating the condition;
   generating grammar based on the evaluating of the condition;
   providing the grammar;
   receiving a recognition indication responsive to speech consistent with the grammar;
   executing the computer executable action responsive to receiving the recognition indication, the recognition indication corresponding to the first word.

6. The computer-readable storage medium of claim 5, the operations further comprising defining the first command set from a first extensible markup language (XML) script file.

7. The computer-readable storage medium of claim 6, wherein:
   the first command set comprises a second command object and a global executable action;
   the computer executable action references the global executable action; and
   the second command object comprises a second computer executable action that references the global executable action.

8. The computer-readable storage medium of claim 5, wherein the recognition indication is responsive to homophonous speech consistent with the grammar.

9. A method comprising:
   receiving a command set comprising a first command object, the first command object comprising first data indicative of:
   a first word;
   a condition comprising a dependency on a hardware attribute of the computer system, the hardware attribute being indicative of a presence of a Universal Serial Bus (USB) device; and a computer executable action;

evaluating the condition;

generating grammar based on the evaluating of the condition;

providing the grammar;

receiving a recognition indication responsive to speech consistent with the grammar;

executing the computer executable action responsive to receiving the recognition indication, the recognition indication corresponding to the first word.

10. The method of claim 9, further comprising defining the first command set from a first extensible markup language (XML) script file.

11. The method of claim 9, wherein:

the first command set comprises a second command object and a global executable action;

the computer executable action references the global executable action; and the second command object comprises a second computer executable action that references the global executable action.

12. The method of claim 9, wherein the recognition indication is responsive to homophonous speech consistent with the grammar.

* * * * *